(12) United States Patent
Sano et al.

(10) Patent No.: US 10,310,093 B2
(45) Date of Patent: Jun. 4, 2019

(54) ELECTRONIC APPARATUS, AND RECEIVER CONTROL METHOD

(71) Applicant: Seiko Epson Corporation, Tokyo (JP)

(72) Inventors: Fumikazu Sano, Matsumoto (JP); Akihiro Shiratsuka, Chino (JP)

(73) Assignee: Seiko Epson Corporation (JP)

( * ) Notice: Subject to any disclaimer, the term of this patent is extended or adjusted under 35 U.S.C. 154(b) by 422 days.

(21) Appl. No.: 15/049,439

(22) Filed: Feb. 22, 2016

(65) Prior Publication Data

US 2016/0245926 A1    Aug. 25, 2016

(30) Foreign Application Priority Data

Feb. 23, 2015  (JP) ................................. 2015-032892

(51) Int. Cl.
*H04W 52/02* (2009.01)
*G01S 19/34* (2010.01)

(52) U.S. Cl.
CPC ......... *G01S 19/34* (2013.01); *H04W 52/0225* (2013.01); *H04W 52/0241* (2013.01)

(58) Field of Classification Search
CPC ..................................................... G01S 19/34
See application file for complete search history.

(56) References Cited

U.S. PATENT DOCUMENTS

| | | | |
|---|---|---|---|
| 5,592,173 A | 1/1997 | Lau et al. | |
| 5,650,785 A * | 7/1997 | Rodal | G01S 19/34 342/352 |
| 6,121,921 A * | 9/2000 | Ishigaki | G01S 19/34 342/357.74 |
| 6,445,341 B2 | 9/2002 | Hasegawa | |
| 6,686,877 B2 * | 2/2004 | Ishigaki | G01S 19/34 342/357.74 |
| 7,071,871 B2 | 7/2006 | Horslund et al. | |
| 7,102,565 B2 * | 9/2006 | Jesson | G01S 19/24 342/357.63 |
| 7,298,321 B2 * | 11/2007 | King | G01S 19/34 342/357.43 |
| 8,134,502 B2 * | 3/2012 | Lennen | G01S 19/34 342/357.63 |

(Continued)

FOREIGN PATENT DOCUMENTS

| | | |
|---|---|---|
| JP | 2011-047950 A | 3/2011 |
| JP | 2015-078867 A | 4/2015 |

OTHER PUBLICATIONS

Wu, Chao-Lin et al., "An adaptive duty-cycle scheme for GPS scheduling in mobile location sensing applications", Second International Workshop on Sensing Applications on Mobile Phones at ACM SenSys, Nov. 1, 2011. (Year: 2011).*

(Continued)

*Primary Examiner* — Gregory C. Issing (74) *Attorney, Agent, or Firm* — Harness, Dickey & Pierce, P.L.C.

(57) ABSTRACT

An electronic apparatus includes a controller that intermittently drives a receiver in a predetermined cycle, the receiver receiving a positioning signal to generate predetermined information, and the controller determines an upper limit of a period to be spent for the generation of the predetermined information on the basis of a period spent for the generation in the past.

5 Claims, 6 Drawing Sheets

(56) References Cited

U.S. PATENT DOCUMENTS

| | | | | |
|---|---|---|---|---|
| 8,731,110 B1* | 5/2014 | Zhou | ............... | G01S 19/34 |
| | | | | 375/142 |
| 9,627,752 B2* | 4/2017 | Gobara | ............... | H01Q 3/24 |
| 2001/0019316 A1 | 9/2001 | Hasegawa | | |
| 2003/0107514 A1* | 6/2003 | Syrjarinne | ............... | G01S 5/0205 |
| | | | | 342/357.74 |
| 2005/0212699 A1 | 9/2005 | Horslund et al. | | |
| 2008/0117103 A1* | 5/2008 | Wang | ............... | G01S 19/34 |
| | | | | 342/357.74 |
| 2009/0168843 A1* | 7/2009 | Waters | ............... | G01S 19/34 |
| | | | | 375/130 |
| 2010/0103038 A1* | 4/2010 | Yeh | ............... | G01S 19/34 |
| | | | | 342/357.74 |
| 2015/0102961 A1 | 4/2015 | Tomii et al. | | |
| 2015/0123847 A1* | 5/2015 | Farmer | ............... | G01S 19/34 |
| | | | | 342/357.74 |
| 2016/0245925 A1* | 8/2016 | Sano | ............... | G01S 19/34 |

OTHER PUBLICATIONS

Mahmoud et al ("Adaptive GPS Duty Cycling"), University of California 2011. Downloaded at https://pdfs.semanticscholar.org/c1ff/8142d113e0f2cc6b4a27c7fe0610241be479.pdf. (Year: 2011).*

* cited by examiner

| UP PERIOD | SLEEP PERIOD |
|---|---|
| SHORTER THAN OR EQUAL TO 3 SECONDS | 30 SECONDS - UP PERIOD |
| SHORTER THAN OR EQUAL TO 6 SECONDS | 60 SECONDS - UP PERIOD |
| SHORTER THAN OR EQUAL TO 9 SECONDS | 90 SECONDS - UP PERIOD |
| SHORTER THAN OR EQUAL TO 12 SECONDS | 120 SECONDS - UP PERIOD |

FIG. 5B

| UP PERIOD | SLEEP PERIOD | INTERMITTENCE CYCLE | DUTY RATIO |
|---|---|---|---|
| SHORTER THAN OR EQUAL TO 3 SECONDS | 30 SECONDS - UP PERIOD | 30 SECONDS | ABOUT 10% |
| SHORTER THAN OR EQUAL TO 6 SECONDS | 60 SECONDS - UP PERIOD | 60 SECONDS | ABOUT 10% |
| SHORTER THAN OR EQUAL TO 9 SECONDS | 90 SECONDS - UP PERIOD | 90 SECONDS | ABOUT 10% |
| SHORTER THAN OR EQUAL TO 12 SECONDS | 120 SECONDS - UP PERIOD | 120 SECONDS | ABOUT 10% |

| OPERATING ENVIRONMENT | PERIOD REQUIRED FOR POSITIONING |
|---|---|
| OpenSky | 3 SECONDS |
| BUILDING INTENSIVE ENVIRONMENT | 6 SECONDS |
| InDoor | ∞ (POSITIONING IMPOSSIBLE) |

FIG. 7B

| OPERATING PERIOD | TYPE OF ENVIRONMENT | NUMBER OF POSITIONING OPERATIONS | UP PERIOD [s] |
|---|---|---|---|
| 0-10 minutes | OpenSky | 20 | 60 |
| 10-20 minutes | BUILDING INTENSIVE ENVIRONMENT | 15 | 138 |
| 20-30 minutes | InDoor | 0 | 600 |

FIG. 7C

| OPERATING PERIOD | TYPE OF ENVIRONMENT | NUMBER OF POSITIONING OPERATIONS | UP PERIOD [s] |
|---|---|---|---|
| 0-10 minutes | OpenSky | 20 | 60 |
| 10-20 minutes | BUILDING INTENSIVE ENVIRONMENT | 0 | 60 |
| 20-30 minutes | InDoor | 0 | 60 |

FIG. 7D

| OPERATING PERIOD | TYPE OF ENVIRONMENT | NUMBER OF POSITIONING OPERATIONS | UP PERIOD [s] |
|---|---|---|---|
| 0-10 minutes | OpenSky | 20 | 60 |
| 10-20 minutes | BUILDING INTENSIVE ENVIRONMENT | 10 | 60 |
| 20-30 minutes | InDoor | 0 | 60 |

ELECTRONIC APPARATUS, AND RECEIVER CONTROL METHOD

CROSS-REFERENCE

This application claims priority to Japanese Patent Application No. 2015-032892, filed Feb. 23, 2015, the entirety of which is hereby incorporated by reference.

BACKGROUND

1. Technical Field

The present disclosure relates to an electronic apparatus, a receiver control method, and a program.

2. Related Art

GNSS apparatus (GNSS: global navigation satellite system), such as a sports watch, have become increasingly commonplace. In a receiver of a GNSS apparatus, however, the duration of a battery tends to shorten because the receiver, for example, repeatedly performs large-burden computation (integration operation) in order to increase reception sensitivity in a poor signal reception state.

To lower electric power consumed by the receiver, it is believed to be effective to apply a method for intermittently driving the receiver. For example, U.S. Pat. No. 5,592,173 discloses a technology for calculating a standby mode time duration by using variables measured by a GPS receiver (GPS: global positioning system).

U.S. Pat. No. 5,592,173, however, does not explicitly show a specific method for calculating the time duration from the measured variables. Therefore, when the receiver is simply driven in an intermittent manner, even a slight decrease in received signal magnitude could cause a significant decrease in successful reception rate (successful positioning rate, successful decoding rate) or a significant increase in power consumption.

SUMMARY

An advantage of some aspects of the present disclosure is to provide an electronic apparatus capable of reducing both variation in successful reception rate due to a change in the environment and variation in power consumption due to the change in the environment, a method for controlling a receiver, and a program.

The present disclosure can be implemented as the following aspects or application examples.

APPLICATION EXAMPLE 1

An electronic apparatus according to this application example includes a controller that intermittently drives a receiver in a predetermined cycle, the receiver receiving a positioning signal to generate predetermined information, and the controller determines (extends as required for example) an upper limit of a period to be spent for the generation on the basis of a period spent for the generation in the past.

In an environment in which the magnitude of a received positioning signal is low, since the period required for the generation typically increases, blindly extending the period spent for the generation significantly increases power consumption. In contrast, the controller according to this application example can determine (extend, for example) the upper limit of the period to be spent per information generation on the basis of the period spent for the generation in the past. The electronic apparatus according to this application example can therefore adjust the period to be spent to newly generate the information in relation to the period spent for the generation in the past, whereby variation in power consumption can be reduced and the successful generation rate can be increased from a long-term viewpoint even when the reception magnitude varies.

APPLICATION EXAMPLE 2

According to the present application example, when the generation has been completed in a pre-specified period (initial upper limit, for example), the controller may add a portion of the pre-specified period that is left after the completion of the generation to a stock period used when the upper limit is determined.

In this case, when the generation is completed in the pre-specified period, since the controller adds the period not having been spent for the generation to the stock period, the period not having been spent for the generation can be used when the upper limit is determined (when the upper limit is extended, for example). Therefore, even when the reception magnitude varies, variation in power consumption from a long-term viewpoint can be reduced.

APPLICATION EXAMPLE 3

According to the present application example, when the generation has not been completed in the pre-specified period, the controller may add at least part of the stock period to the upper limit to extend the upper limit.

In this case, the controller adds at least part of the stock period to the upper limit to allow the period left when the generation has been completed in the pre-specified period to be carried over and used later when the generation is not completed in the pre-specified period. The electronic apparatus according to the present application example can therefore reduce the number of failures of the generation due, for example, to the reception magnitude.

APPLICATION EXAMPLE 4

According to the present application example, the controller may subtract the added period from the stock period.

In this case, the controller subtracts the period added to the pre-specified period from the stock period to prevent a large variation in the sum of the period spent for the generation even when the case where the generation is completed in the pre-specified period and the case where the generation is not completed in the pre-specified period both occur. Variation in power consumption from a long-term viewpoint can therefore be reduced.

APPLICATION EXAMPLE 5

According to the present application example, the controller may set the extended period to be shorter than or equal to a predetermined period.

Providing the upper limit of the period to be extended as described above avoids a situation in which the period spent for the generation continues endlessly in an environment in which the reception magnitude is extremely low.

APPLICATION EXAMPLE 6

According to the present application example, the information may contain information representing an orbit of a positioning satellite that issues the positioning signal.

The electronic apparatus according to the present application example can therefore stabilize the rate of successful generation of the information representing the orbit of the positioning satellite.

APPLICATION EXAMPLE 7

According to the present application example, the controller may set the cycle to be shorter than an effective period of the information.

The electronic apparatus according to the present application example therefore allows the receiver to generate new information before the effective period of the information expires.

APPLICATION EXAMPLE 8

According to the present application example, the electronic apparatus may further include the receiver.

APPLICATION EXAMPLE 9

A control method according to the present application example includes intermittently driving a receiver in a predetermined cycle, the receiver receiving a positioning signal to generate predetermined information, and determining an upper limit of a period to be spent for the generation on the basis of a period spent for the generation in the past.

In an environment in which the magnitude of a received positioning signal is low, since the period required for the generation typically increases, blindly extending the period spent for the generation significantly increases power consumption. In contrast, the control method according to the present application example can determine the upper limit of the period to be spent per information generation on the basis of the period spent for the generation in the past. Therefore, according to the control method of the present application example, the period to be spent to newly generate the information can be adjusted in relation to the period spent for the generation in the past, whereby variation in power consumption can be reduced and the successful generation rate can be increased from a long-term viewpoint even when the reception magnitude varies.

APPLICATION EXAMPLE 10

A program according to the present application example causes a computer to perform intermittently driving a receiver in a predetermined cycle, the receiver receiving a positioning signal to generate predetermined information and determining an upper limit of a period to be spent for the generation on the basis of a period spent for the generation in the past.

In an environment in which the magnitude of a received positioning signal is low, since the period required for the generation typically increases, blindly extending the period spent for the generation significantly increases power consumption. In contrast, the program according to the present application example can determine the upper limit of the period to be spent per information generation on the basis of the period spent for the generation in the past. The computer in the present application example can therefore adjust the period to be spent to newly generate the information in relation to the period spent for the generation in the past, whereby variation in power consumption can be reduced and the successful generation rate can be increased from a long-term viewpoint even when the reception magnitude varies.

BRIEF DESCRIPTION OF THE DRAWINGS

The present disclosure will be described with reference to the accompanying drawings, wherein like numbers reference like elements.

DESCRIPTION OF EXEMPLARY EMBODIMENTS

Preferable embodiment of the present disclosure will be described below in detail with reference to the drawings. It is not intended that the embodiments described below unduly limit the contents of the present disclosure set forth in the appended claims. Further, all configurations described below are not necessarily essential configuration requirements of the present disclosure.

1. Embodiment

Figure 1:
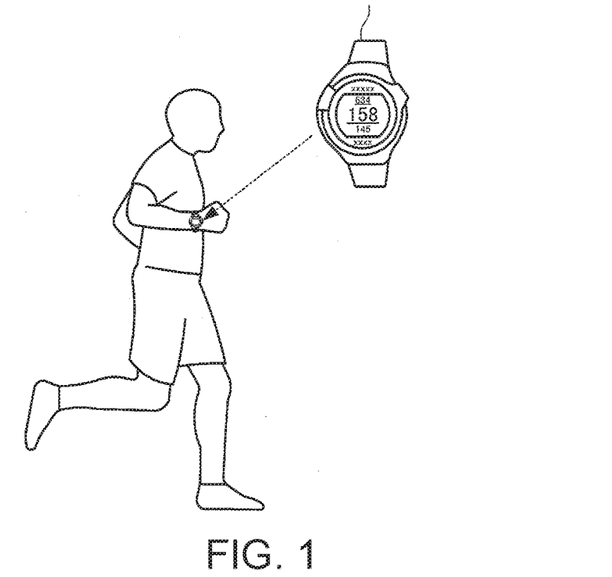
FIG. 1 describes an outline of an electronic apparatus in an embodiment.

FIG. 1 describes an outline of an electronic apparatus according to the present embodiment. An electronic apparatus 1 is, for example, a portable information apparatus attached to part of a user's body in a sports event or any other occasion, as shown in FIG. 1. To allow the user to visually recognize the electronic apparatus 1 when necessary, the portion to which the electronic apparatus 1 is attached is a body part, for example, within a region from an elbow to a hand (forearm). In the example shown in FIG. 1, the electronic apparatus 1 is configured as a wrist-type (wristwatch-type) portable information apparatus (outdoor watch), and the portion to which the electronic apparatus 1 is attached is a wrist. The electronic apparatus 1 is what is called a GNSS apparatus having a built-in positioning function.

The power consumed by the thus configured electronic apparatus 1 is desired not to be greatly affected by the environment. For example, the duration of a battery is desired to be kept in a range from about 50 to 100 hours irrespective of the environment.

The successful reception rate (successful positioning rate, successful decoding rate) of the electronic apparatus 1 is also desired not to be greatly affected by the environment. Even when the environment is not an open-sky environment but is a building-intensive environment where received signal magnitude is believed to be low, it is desired to avoid a situation in which the successful reception rate is zero.

To this end, the electronic apparatus 1 according to the present embodiment dynamically changes a positioning attempt frequency (intermittent driving cycle) to avoid a significant increase in power consumption and a significant decrease in successful positioning rate in a low reception magnitude environment.

Further, the electronic apparatus 1 according to the present embodiment maintains the power consumption as fixed as possible while suppressing variation in successful decoding rate due to a change in the environment by dynamically changing the upper limit of the period spent for a decoding attempt (timeout period).

Configuration of Electronic Apparatus

Figure 2:
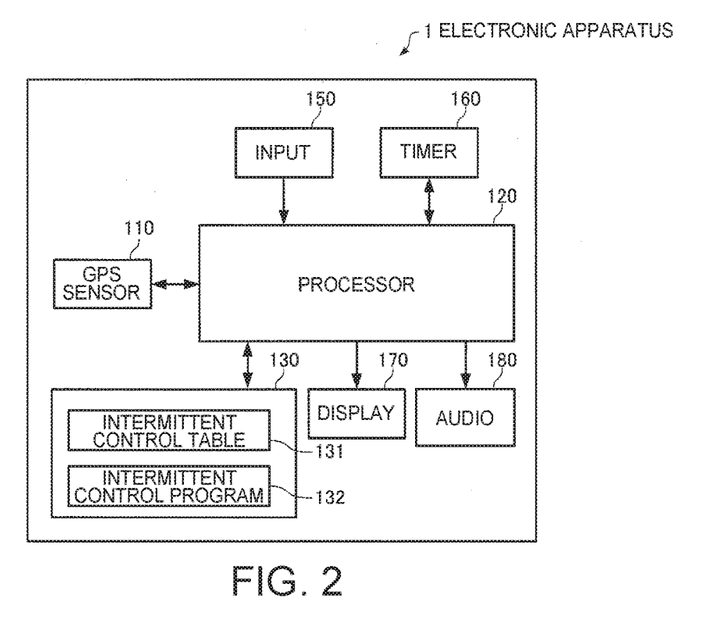
FIG. 2 describes an example of the configuration of the electronic apparatus.

FIG. 2 is a functional block diagram showing an example of the configuration of the electronic apparatus 1. The electronic apparatus 1 includes a GPS sensor 110, a processor 120, a storage device 130, an input 150, a timer 160, a display 170, a audio 180, a battery that is not shown, and other components, as shown in FIG. 2. The electronic apparatus 1 may, however, be so configured that part of the components described above is omitted or changed or another component is added.

The GPS sensor 110 (an example of GNSS sensor) is a sensor that generates positioning data showing the position and other parameters of the electronic apparatus 1 and outputs the positioning data and other parameters to the processor 120, and the GPS sensor 110 includes a GPS receiver and other components. The GPS sensor 110 receives an externally incoming electromagnetic wave in a predetermined frequency band via a GPS antenna that is not shown, extracts a GPS signal from a GPS satellite, and generates the position of the electronic apparatus 1 (an example of the positioning data) on the basis of the GPS signal.

The processor 120 is formed, for example, of a CPU (central processing unit), a DSP (digital signal processor), and an ASIC (application specific integrated circuit). The processor 120 performs a variety of types of processing in accordance with a program (such as intermittent control program 132) stored in the storage device 130 and the user's instruction inputted through the input 150. Examples of the processing performed by the processor 120 include data processing on the data generated by the GPS sensor 110, display control processing that allows the display 170 to display an image, and sound output control processing that allows the audio 180 to output sound.

The storage device 130 is formed, for example, of one or more IC memories and includes a ROM that stores the intermittent control program 132 and other data and a RAM that serves as a work area for the processor 120. The RAM includes a nonvolatile RAM, and the nonvolatile RAM provides a storage area for storing an intermittent control table 131 and other areas.

The input 150 is formed, for example, of buttons, keys, a microphone, and a touch panel and carries out the process of converting an instruction from the user into an appropriate signal and transmitting the signal to the processor 120.

The timer 160 is formed, for example, of a real-time clock (RTC) IC and carries out the process of generating time data, such as the year, month, day, hour, minute, and second.

The display 170 is formed, for example, of an LCD (liquid crystal display), an organic EL (electroluminescence) display, an EPD (electrophoretic display), or a touch panel display and displays a variety of images in accordance with an instruction from the processor 120.

The audio 180 is formed, for example, of a loudspeaker, a buzzer, or a vibrator and produces a variety of types of sound (or vibration) in accordance with an instruction from the processor 120.

Basic Action of GPS Sensor

The GPS sensor 110 includes an RF reception circuit that down-converts a radio-frequency signal (RF signal) received via the antenna that is not shown into an intermediate-frequency signal, amplifies and otherwise processes the intermediate-frequency signal, and then converts the amplified signal into a digital signal, a baseband circuit that performs correlation operation and other types of operation on the digital signal (baseband signal) from the RF reception circuit, and other circuits. In place of the down-conversion to an intermediate frequency, a direct conversion method for directly converting the RF signal into the baseband signal can be employed.

Among the circuits that form the GPS sensor 110, the baseband circuit performs known correlation operation on received signals to search (frequency search, phase search) GPS signals coded on the basis of a predetermined rule so as to capture a plurality of GPS satellites. For each of the captured GPS satellites, the baseband circuit locates a phase and a frequency at which a correlation peak value has been detected and sets the phase and the frequency as a code phase and a reception frequency of the GPS signal. The baseband circuit further decodes each of the captured GPS signals to acquire an ephemeris (satellite orbit information representing the orbit of the GPS satellite), time information, and other types of information. The baseband circuit uses the acquired ephemeris, time information, and other types of information to perform known operation so as to calculate a pseudo distance between the GPS satellites and the GPS sensor 110 (electronic apparatus 1), and the velocity vector, the position, and other parameters of the GPS sensor 110 (electronic apparatus 1). The code phase, the pseudo distance, and the velocity vector are other examples of the positioning data.

The period required for the GPS sensor 110 to generate positioning data (referred to as "period required for positioning" in the present specification, including a case where positioning data other than the position is generated) is in principle a period corresponding to a carrier wave period (reception period) having the code length of the C/A (coarse/acquisition) code, which is a spread code of a GPS signal, and the shortest period is, for example, one millisecond.

On the other hand, the period required for the GPS sensor 110 to generate the ephemeris (period required for decoding) is in principle a period required to decode a navigation message contained in a GPS signal, and the shortest period is, for example, 18 seconds (about 30 seconds when a longer period is required).

When the magnitude of a received GPS signal is low, however, the baseband circuit of the GPS sensor 110 carries out the process for improving sensitivity of GPS signal reception (reducing noise), for example, by increasing the number of on-memory signal integration operations (the number of coherent and incoherent integration operations performed on each component contained in the signal). The period required for the GPS sensor 110 to perform actual positioning and the period required for the GPS sensor 110 to perform actual decoding therefore depend on the environment in which the electronic apparatus 1 is present (signal reception environment).

Positioning-related Action of Processor

The processor 120 in the present embodiment causes the battery that is not shown to intermittently supply the GPS sensor 110 with electric power (that is, intermittently drives the GPS sensor 110) and controls the cycle of the positioning attempt made by the GPS sensor 110, the period spent by the GPS sensor 110 to perform the positioning in the cycle (up period), and a sleep period for which the GPS sensor 110 is idle in the cycle. In other words, the processor 120 controls the cycle in accordance which the GPS sensor 110 starts operating, the length of the period for which the GPS sensor 110 keeps operating, and the length of the period for which the GPS sensor 110 stops operating.

It is assumed in the description that the processor 120 changes the cycle of the positioning attempt made by the GPS sensor 110 over a range from 30 to 120 seconds but fixes the upper limit of the period spent by the GPS sensor 110 to perform positioning (timeout period) at 12 seconds. The reason why the timeout period is provided is to avoid a situation in which the GPS sensor 110 is driven in vain in an environment in which a GPS signal is hardly received (such as indoor environment).

The in-cycle action of the processor 120 is basically formed of the following steps (1) to (4).

(1) The processor 120 first sets the state of the GPS sensor 110 to be an up state at the cycle start time.

(2) The processor 120 then causes the GPS sensor 110 to transition to a sleep state when the GPS sensor 110 has completed positioning (that is, when the GPS sensor 110 has generated positioning data).

(3) The processor 120 then terminates the sleep state (that is, the processor 120 sets the state of the GPS sensor 110 to be the up state) when a period (10 times the up period, for example) according to the period spent by the GPS sensor 110 to perform the positioning (up period) has elapsed and transitions to the following cycle.

(4) However, when the positioning has not been completed after the timeout period (12 seconds) had elapsed since the GPS sensor 110 was caused to transition to the up state, the processor 120 forces the GPS sensor 110 to transition to the sleep state.

FIGS. 3A to 3D are diagrammatic view showing examples of a positioning-related intermittent driving pattern in accordance with which the GPS sensor 110 is driven. In FIGS. 3A to 3D, each hatched block represents the up period (the period for which electric power is supplied to the GPS sensor 110), each open block represents the sleep period (the period for which electric power supply to the GPS sensor 110 is suspended), and reference character T denotes the cycle of the positioning attempt (period from the time at which electric power supply to the GPS sensor 110 starts to the time at which the following electric power supply to the GPS sensor 110 starts, with the electric power supply suspension period interposed therebetween).

Figure 3A:
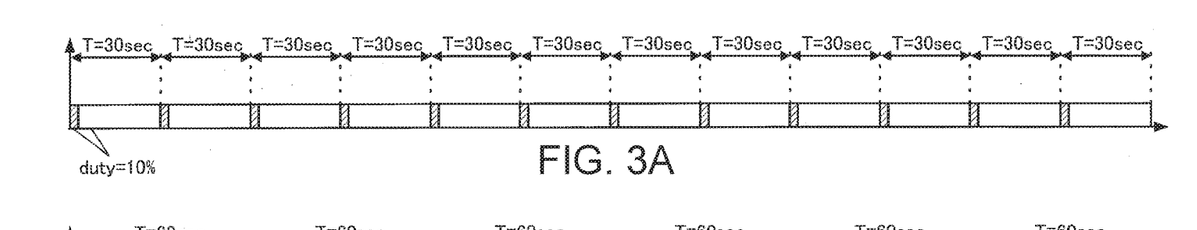
FIGS. 3A to 3D describe examples of a positioning-related intermittent driving pattern.
Figure 3B:
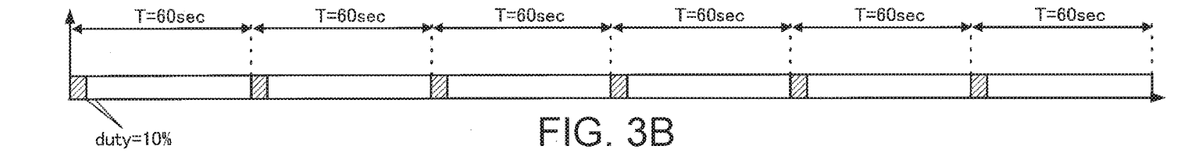
Figure 3C:
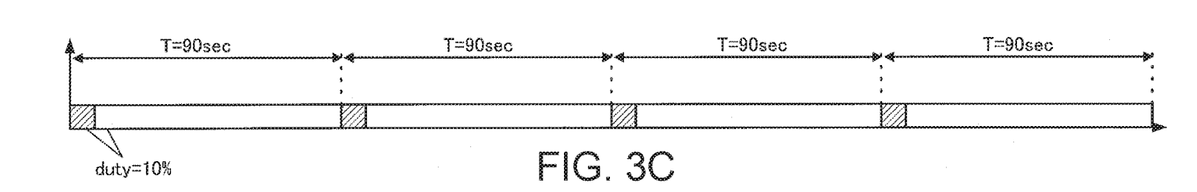
Figure 3D:
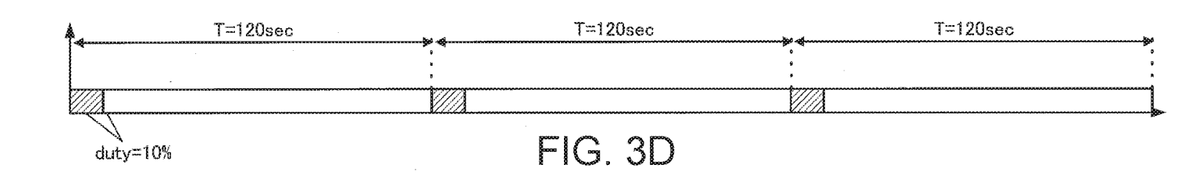

FIG. 3A diagrammatically shows an intermittent pattern in a case where the electronic apparatus 1 is located in a high reception magnitude environment (open-sky environment, for example). FIG. 3B diagrammatically shows an intermittent pattern in a case where the electronic apparatus is located in a second highest reception magnitude environment (residential environment, for example). FIG. 3C diagrammatically shows an intermittent pattern in a case where the electronic apparatus 1 is located in a third highest reception magnitude environment (building intensive environment, for example). FIG. 3D diagrammatically shows an intermittent pattern in a case where the electronic apparatus is located in a fourth highest reception magnitude environment (indoor environment, for example).

According to the intermittent pattern shown in FIG. 3A, the in-cycle up period is set at 3 seconds. According to the intermittent pattern shown in FIG. 3B, the in-cycle up period is set at 6 seconds. According to the intermittent pattern shown in FIG. 3C, the in-cycle up period is set at 9 seconds. According to the intermittent pattern shown in FIG. 3D, the in-cycle up period is set at 12 seconds.

Comparison of FIGS. 3A to 3D with one another shows that the lower the reception magnitude, the longer the in-cycle up period (hatched block), because the lower the reception magnitude, the longer the period required for positioning.

In the present embodiment, however, the longer the up period, the longer the set sleep period, and therefore, the lower the reception magnitude, the longer the cycle T of the positioning attempt.

Therefore, in the present embodiment, the duty ratio of the intermittence ((duty ratio [%])=100×(up period [sec])/(cycle [sec])) is set at the same value among FIGS. 3A to 3D (10% in the examples in FIGS. 3A to 3D). That is, the duty ratio of the intermittence is not affected by the environment in the present embodiment.

The sleep period in each positioning-related cycle can be determined by substituting the up period and the duty ratio required for the positioning in the cycle into, for example, the following expression. The required duty ratio changes with the duration of the battery and other factors required by the electronic apparatus 1 and can be set as appropriate in accordance with required specifications, action modes, and other factors of the electronic apparatus 1.

(Sleep period [sec])=100×(up period [sec])/(required duty ratio[%])−(up period [sec])

The up period in each positioning-related cycle is expressed as follows.

(Up period [sec])=(period required for positioning [sec]) (in a case where the positioning has been completed in the timeout period)

(Up period [sec])=(timeout period [sec]) (in a case where the positioning has not been completed in the timeout period)

Decoding-related Action of Processor

The processor 120 in the present embodiment causes the battery that is not shown to intermittently supply the GPS sensor 110 with electric power (that is, intermittently drives the GPS sensor 110) and controls the cycle of the decoding attempt made by the GPS sensor 110, the period spent by the GPS sensor 110 to perform the decoding in the cycle (up period), and the sleep period for which the GPS sensor 110 is idle in the cycle.

It is assumed in the description that the processor 120 fixes the cycle of the decoding attempt made by the GPS sensor 110 at 1 hour (1 hour is a period shorter than 4 hours, which is the effective period of an ephemeris) but changes the upper limit of the period spent by the GPS sensor 110 to perform decoding (timeout period) over a range from 5 to 10 minutes. The reason why the timeout period is provided is to avoid a situation in which the GPS sensor 110 is driven in vain in an environment in which a GPS signal is hardly received (such as indoor environment).

The in-cycle action of the processor 120 is basically formed of the following steps (1) to (5).

(1) The processor 120 first sets the state of the GPS sensor 110 to be the up state immediately after each cycle starts.

(2) The processor 120 then causes the GPS sensor 110 to transition to the sleep state when the GPS sensor 110 has completed decoding (that is, when the GPS sensor 110 has generated an ephemeris).

(3) The processor 120 then terminates the sleep state when a predetermined period (1 hour) has elapsed since the cycle started and transitions to the following cycle.

(4) However, when the decoding has not been completed after the timeout period had elapsed since the GPS sensor 110 was caused to transition to the up state, the processor 120 forces the GPS sensor 110 to transition to the sleep state.

(5) The processor 120 adjusts the timeout period as follows.

(5-1) The processor 120 first sets the timeout period at an initial value (5 minutes) immediately after each cycle starts.

(5-2) When the decoding has been completed before the timeout period elapses, the processor 120 adds the remaining period of the timeout period ((remaining period [min])= (timeout period [min])−(up period [min])) to a stock period.

The stock period is a period that can be appropriated for extension of the timeout period and is determined by subtraction of the sum of extended periods (consumed periods) of the timeout period in the past decoding from the sum of remaining periods in the past decoding.

(5-3) On the other hand, when the timeout period has elapsed but the decoding has not been completed, the processor 120 adds at least part of the stock period to the timeout period to extend the timeout period and subtracts the period extended to allow the decoding to be completed from the stock period. It is, however, noted that when the decoding has been completed before the extended timeout period elapses, the processor 120 causes the GPS sensor 110 to transition to the sleep period when the decoding has been completed and adds the remaining period of the extended timeout period to the stock period (that is, when decoding has been completed in a period shorter than the extended timeout period, the remaining period is returned to the stock period).

The processor 120 in (5-3) may instead successively extend the timeout period by a small length (by a predetermined period) while checking whether or not decoding has been completed and stop extending the timeout period when the decoding has been completed. In this case, the processor 120 may not subtract the extended period from the stock period whenever the extension is made but may subtract the period consumed before the extension is terminated (total extended period) from the stock period all at once.

(5-4) The processor 120, however, sets a maximum extension of the timeout period to a predetermined value (5 minutes). Further, when the stock period is zero, the processor 120 does not extend the timeout period. The in-cycle timeout period is therefore adjusted as appropriate to a value ranging from the initial value (5 minutes) to the maximum value (10 minutes). The adjustment described above prevents excess power consumption, for example, when the magnitude of a received GPS signal keeps at a low level.

Figure 4A:
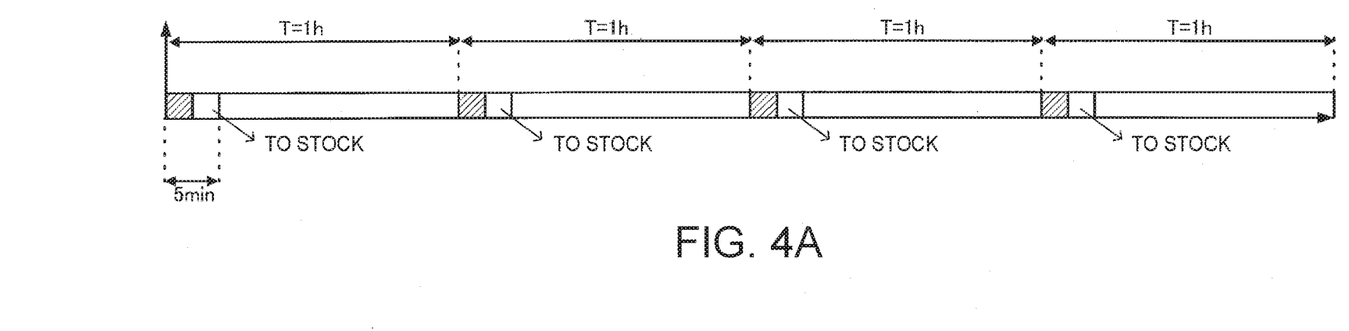
FIGS. 4A and 4B describe examples of a decoding-related intermittent driving pattern.
Figure 4B:
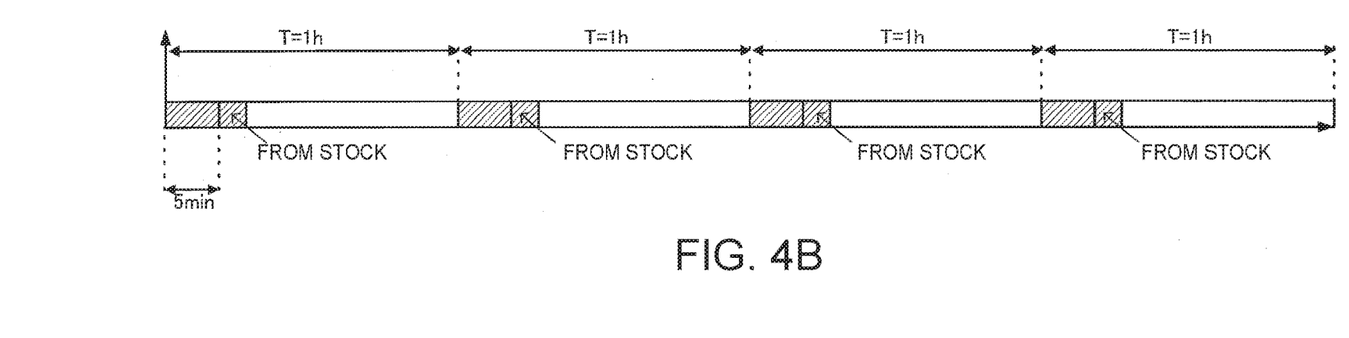

FIGS. 4A and 4B are diagrammatic views showing examples of a decoding-related intermittent driving pattern in accordance with which the GPS sensor 110 is driven. In FIGS. 4A and 4B, each hatched block represents the up period (the period for which electric power is supplied to the GPS sensor 110), each open block represents the sleep period (the period for which electric power supply to the GPS sensor 110 is suspended), and reference character T denotes the cycle of the decoding attempt.

FIG. 4A diagrammatically shows an intermittent pattern in the case where the electronic apparatus 1 is located in a high reception magnitude environment (open-sky environment, for example), and FIG. 4B diagrammatically shows an intermittent pattern in the case where the electronic apparatus 1 is located in a lower reception magnitude environment (building intensive environment, for example).

Comparison of FIGS. 4A and 4B with each other shows that the lower the reception magnitude, the longer the in-cycle up period (hatched block), because the lower the reception magnitude, the longer the period required for decoding.

In the present embodiment, however, when the up period in a past cycle is shorter than the initial timeout period (5 minutes), the remaining period is saved and added to the stock period and carried over to the up period in a later cycle.

Therefore, in the present embodiment, energy balance over a long-term range (power consumption over a plurality of cycles) is unlikely to be greatly affected by the environment.

In the above description, the positioning-related intermittent driving (FIGS. 3A to 3D) and the decoding-related intermittent driving (FIGS. 4A and 4B) have been separately described. It is, however, assumed in the present embodiment that the two types of intermittent driving are concurrently performed, and that in a period for which both the positioning-related intermittent driving and the decoding-related intermittent driving are performed, the (low-frequency) decoding-related intermittent driving precedes the (high-frequency) positioning-related intermittent driving. That is, in the up period in the decoding-related intermittent driving, electric power is supplied to the GPS sensor 110 even in a period corresponding to the sleep period in the positioning-related intermittent driving. Further, since the period required for positioning is shorter than the period required for decoding, generation of positioning data is repeated multiple times during single decoding operation.

Control Table

Figure 5A:
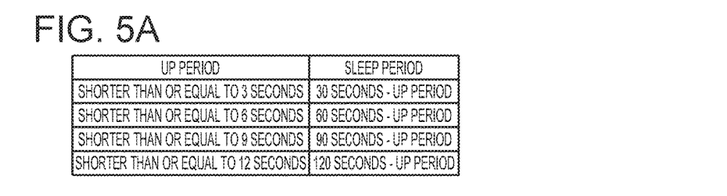
FIGS. 5A and 5B describe examples of an intermittent control table.

FIG. 5A describes a positioning-related intermittent control table 131. In place of the calculation formula described in the paragraph "Positioning-related action of processor," the intermittent control table 131, such as that shown in FIG. 5A, may be used to determine the sleep period and the intermittence cycle.

The intermittent control table 131 is a reference table for determining the sleep period on the basis of the up period, as shown in FIG. 5A. The intermittent control table 131 therefore stores a variety of up periods, and sleep periods suitable for the respective up periods, with the up periods and the sleep periods related to each other. A sleep period based on an up period is, for example, as follows.

(1) When the up period is longer than 0 seconds but shorter than or equal to 3 seconds, (sleep period [sec])=(30 seconds)−(up period [sec]).

(2) When the up period is longer than 3 seconds but shorter than or equal to 6 seconds, (sleep period [sec])=(60 seconds)−(up period [sec]).

(3) When the up period is longer than 6 seconds but shorter than or equal to 9 seconds, (sleep period [sec])=(90 seconds)−(up period [sec]).

(4) When the up period is longer than 9 seconds but shorter than or equal to 12 seconds, (sleep period [sec])= (120 seconds)−(up period [sec]).

In a case where the timeout period has elapsed but the positioning has not been completed and the up state is forced to transition to the sleep state, the up period coincides with the timeout period (12 seconds), and the case therefore belongs to the case (4).

Figure 5B:
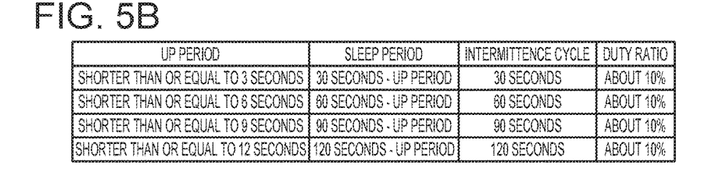

According to the intermittent control table 131 described above, the up period, the sleep period, the cycle, and the duty ratio within a cycle of positioning attempt are set as shown in FIG. 5B. That is, according to the intermittent control table 131 described above, the duty ratio in the positioning-related intermittence is maintained at a value in the vicinity of a predetermined value (10%).

Action of Electronic Apparatus

Figure 6:
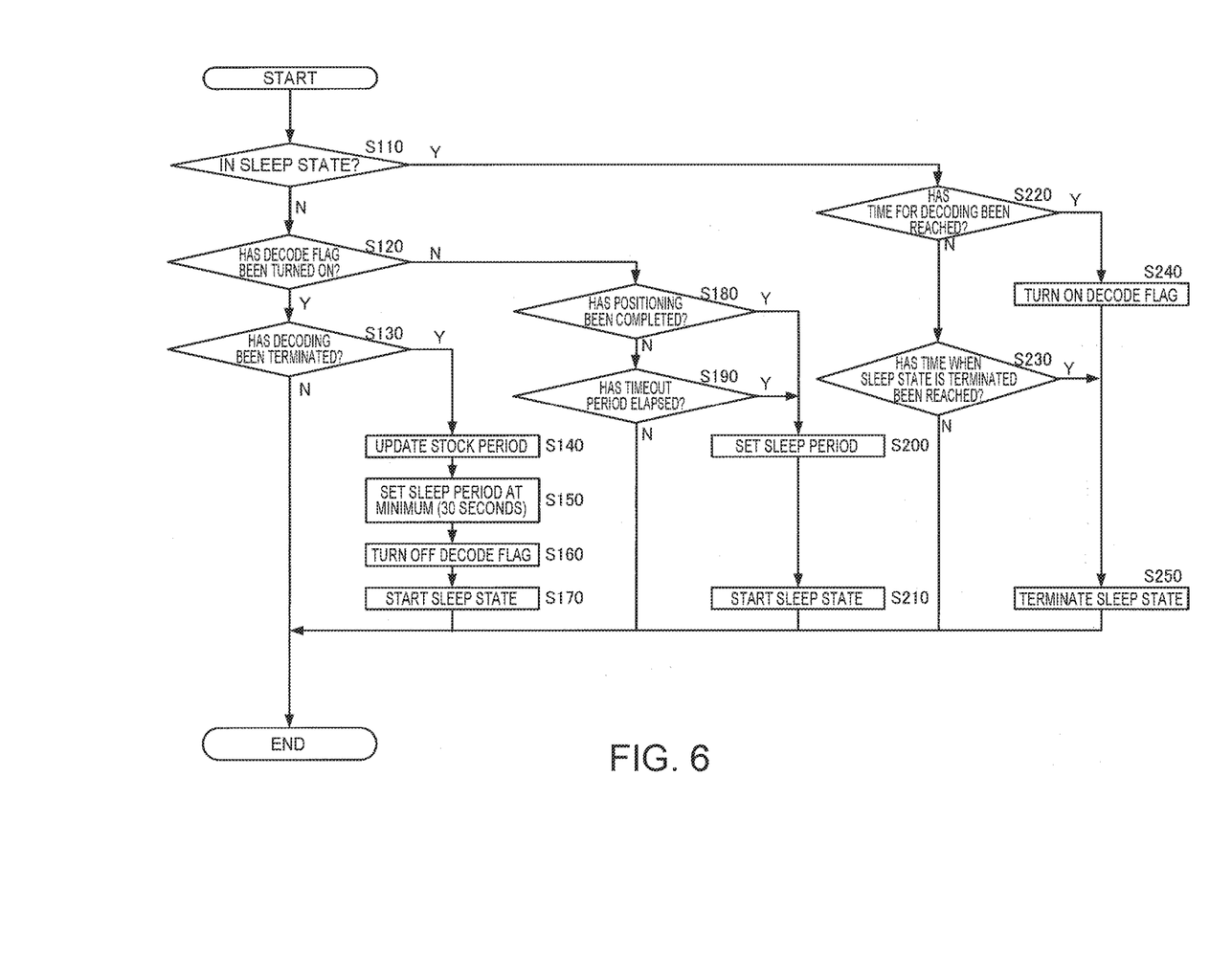
FIG. 6 is a flowchart for describing an example of action of the electronic apparatus.

FIG. 6 is a flowchart for describing the intermittent-control-related action of the processor 120. The action of the processor 120 follows the intermittent control program 132.

The flowchart of FIG. 6 reflects both the positioning-related intermittent control and the decoding-related intermittent control.

It is now assumed that first decoding (generation of ephemeris) has been completed at the time of start of the flowchart of FIG. 6. The up period for the first decoding preferably lasts as long as possible until the decoding is completed. However, to suppress excess power consumption in an environment in which it is difficult to receive a GPS signal, such as an indoor environment, it is preferable to set the timeout period to be longer than or equal to the maximum timeout period for decoding in the present embodiment (10 minutes, for example). It is further assumed that after the processes from Start to End in FIG. 6 are completed, the processor 120 proceeds to Start again and repeats the processes. The period required to carry out the processes is a short period, for example, shorter than or equal to 1 second. The processor 120 thus flexibly handles environmental changes. Each step in FIG. 6 will be sequentially described below.

Step S110: The processor 120 checks whether or not the GPS sensor 110 is in the sleep state, and when a result of the checking shows that the GPS sensor 110 is in the sleep state (step S110: Y), the processor 120 proceeds to step S220, whereas when a result of the checking shows that the GPS sensor 110 is not in the sleep state (step S110: N), the processor 120 proceeds to step S120.

Step S120: The processor 120 checks whether or not a decode flag has been turned on, and when a result of the checking shows that the decode flag has been turned on (step S120: Y), the processor 120 proceeds to step S130, whereas when a result of the checking shows that the decode flag has not been turned on (step S120: N), the processor 120 proceeds to step S180. The decode flag is a flag showing whether or not the GPS sensor 110 is performing decoding.

Step S130: The processor 120 checks whether or not the GPS sensor 110 has terminated the decoding, and when a result of the checking shows that the GPS sensor 110 has terminated the decoding (step S130: Y), the processor 120 proceeds to step S140, whereas when a result of the checking shows that the GPS sensor 110 has not terminated the decoding (step S130: N), the processor 120 terminates the procedure of the flowchart.

"Termination of decoding" used herein includes a case where decoding has been terminated because the timeout period has elapsed and a case where decoding has been terminated because an ephemeris has been generated (decoding has been completed).

When the initial timeout period (5 minutes) for decoding has elapsed but the decoding has not been completed, the processor 120 appropriates (at least part of) the stock period for the timeout period to extend the timeout period (not shown).

The processor 120, however, limits a maximum in-cycle extended period to a predetermined value (5 minutes). Further, when the stock period is zero, the processor 120 does not extend the timeout period. The in-cycle timeout period is therefore adjusted as appropriate to a value ranging from the initial value (5 minutes) to the maximum value (10 minutes).

Step S140: The processor 120 updates the stock period as follows.

First, when the decoding has been completed before the (initial) timeout period elapses, the processor 120 adds the remaining period of the timeout period ((remaining period)=(timeout period)−(up period)) to the stock period.

On the other hand, when the (initial) timeout period is extended, the processor 120 subtracts the extended period from the stock period.

Step S150: The processor 120 sets the sleep period at the minimum value (30 seconds).

Step S160: The processor 120 turns off the decode flag.

Step S170: The processor 120 causes the GPS sensor 110 to transition to the sleep state and terminates the procedure of the flowchart.

Step S180: The processor 120 checks whether or not the positioning has been completed, and when a result of the checking shows that the positioning has been completed (step S180: Y), the processor 120 proceeds to step S200, whereas when a result of the checking shows that the positioning has not been completed (step S180: N), the processor 120 proceeds to step S190.

Step S190: The processor 120 checks whether or not the positioning-related timeout period (12 seconds) has elapsed, and when a result of the checking shows that the positioning-related timeout period has elapsed (step S190: Y), the processor 120 proceeds to step S200, whereas when a result of the checking shows that the positioning-related timeout period has not elapsed (step S190: N), the processor 120 terminates the procedure of the flowchart (END).

Step S200: The processor 120 refers to the intermittent control table 131 on the basis of the up period (period required for positioning or timeout period) to determine an appropriate sleep period as the following sleep period.

Step S210: The processor 120 causes the GPS sensor 110 to transition to the sleep state and terminates the procedure of the flowchart.

Step S220: The processor 120 checks whether or not the time for the decoding attempt has been reached (one hour has elapsed since the previous decoding started), and when a result of the checking shows that the time has been reached (step S220: Y), the processor 120 proceeds to step S240, whereas when a result of the checking shows that the time has not been reached (step S220: N), the processor 120 proceeds to step S230.

Step S230: The processor 120 checks whether or not the time when the sleep period ends (the time when the sleep state is terminated) has been reached, and when a result of the checking shows that the time has been reached (step S230: Y), the processor 120 proceeds to step S250, whereas when a result of the checking shows that the time has not been reached (step S230: N), the processor 120 terminates the procedure of the flowchart.

Step S240: The processor 120 turns on the decode flag.

Step S250: The processor 120 terminates the sleep state of the GPS sensor 110 (causes the GPS sensor 110 to transition to the up state) and terminates the procedure of the flowchart.

Comparison with Comparative Examples

Positioning-related effects provided by the electronic apparatus 1 will be examined below.

Figure 7A:
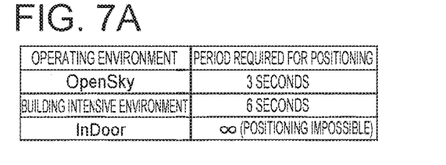
FIGS. 7A to 7D compare Comparative Example 1, Comparative Example 2, and the present embodiment with one another.

It is assumed in the examination that the electronic apparatus according to the present embodiment is placed in an open-sky environment for the first 10 minutes, in a building intensive environment for the next 10 minutes, and in an indoor environment for the next 10 minutes. It is further assumed that the period required for positioning for each of the environments is set in accordance with FIG. 7A. That is, the required period is assumed to be 3 seconds in the open-sky environment, 6 seconds in the building intensive environment, and infinity (positioning impossible) in the indoor environment.

For comparison with the present embodiment, Comparative Example 1 and Comparative Example 2 will be examined. Comparative Example 1, Comparative Example 2, and the present embodiment have conditions presented below. Conditions that are not referred to below are those common to the Comparative Example 1, Comparative Example 2, and the present embodiment.

(1) Comparative Example 1

In-cycle up period: Equal to the period required for positioning

In-cycle sleep period: Fixed at 30 seconds

In-cycle timeout period: ∞ (no timeout)

(2) Comparative Example 2

In-cycle up period: Fixed at 3 seconds

In-cycle sleep period: Fixed at 30 seconds

In-cycle timeout period: 3 seconds (equal to up period)

(3) Present Embodiment

In-cycle up period: Equal to the period required for positioning as long as the required period is shorter than or equal to the timeout period In-cycle sleep period: Length according to the up period (as shown in FIG. 5A)

In-cycle timeout period: 12 seconds

Figure 7B:
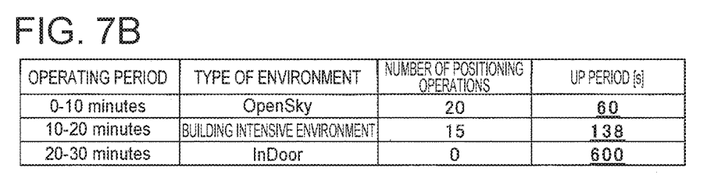

According to the electronic apparatus of Comparative Example 1, the up period and the number of positioning operations for each of the environments are those shown in FIG. 7B. According to Comparative Example 1, the up period is as short as 60 seconds in the open-sky environment but increased to 138 seconds in the building intensive environment and further increased to as long as 600 seconds in the indoor environment, as shown in FIG. 7B. The electronic apparatus according to Comparative Example 1 is therefore considered to operate in such a way that the power consumption greatly varies with changes in the environment.

Figure 7C:
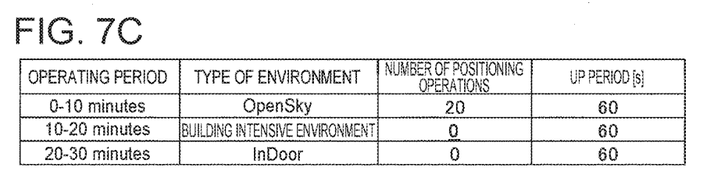

According to the electronic apparatus of Comparative Example 2, the up period and the number of positioning operations for each of the environments are those shown in FIG. 7C. According to Comparative Example 2, the up period is kept at a fixed value of 60 seconds irrespective of the environment, but the number of positioning operations decreases to zero even in the building intensive environment, which is believed to allow positioning, as shown in FIG. 7C. The electronic apparatus according to Comparative Example 2 is therefore considered to operate in such a way that the successful positioning rate greatly varies with changes in the environment.

Figure 7D:
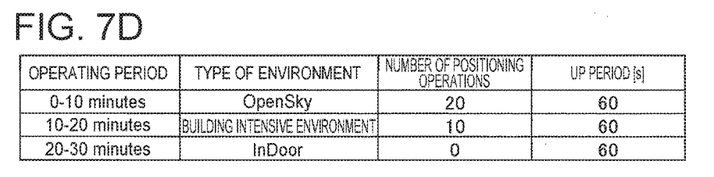

According to the electronic apparatus of the present embodiment, the up period and the number of positioning operations for each of the environments are those shown in FIG. 7D. According to the present embodiment, variation in the up period due to the changes in the environment and variation in the number of positioning operations due to the changes in the environment are suppressed in a well-balanced manner, as shown in FIG. 7D. The electronic apparatus according to the present embodiment is therefore considered to operate in such a way that variation in power consumption due to the changes in the environment and variation in the successful positioning rate due to changes in the environment are suppressed in a well-balanced manner.

2. Outline of Embodiment

The electronic apparatus 1 according to the embodiment described above includes a controller (processor 120) that determines the cycle in accordance with which a receiver (GPS sensor 110) that receives a positioning signal (GPS signal) and generates predetermined information (positioning data) is intermittently driven on the basis of the period spent to generate the information (up period).

In an environment in which the magnitude of a received positioning signal (GPS signal) is low, since the period required for the generation typically increases, blindly shortening the period spent for the generation (up period) could significantly lower the successful generation rate. In contrast, the controller (processor 120) in the present embodiment determines the intermittent driving cycle on the basis of the period spent to generate the information. In general, the period spent to generate the information changes with the reception magnitude. In view of the fact, determining the intermittent driving cycle on the basis of the spent period allows suppression of variation in successful reception rate due to variation in the period spent to generate the information and suppression of variation in power consumption due to variation in the spent period.

That is, the controller (processor 120) in the present embodiment does not fix one of the spent period and the intermittent driving cycle but changes the intermittent driving cycle in accordance with an actually spent period, whereby significant deterioration of one of the success rate and the power consumption is avoided.

Further, the controller (processor 120) sets the cycle described above to be longer when a longer period (up period) has been spent to generate the information described above.

In this case, for example, in an environment in which the reception magnitude is low, the controller (processor 120) allows reduction in the frequency of information generation attempt at the sacrifice of a longer period (up period) spent per information generation than in an environment in which the reception magnitude is high. As a result, for example, in an environment in which the reception magnitude is low, a decrease in successful reception rate can be reduced, and an increase in power consumption can be reduced.

Further, the controller (processor 120) determines the cycle described above in such a way that the duty ratio in the intermittent driving described above is maintained.

The electronic apparatus 1 according to the present embodiment can therefore suppress variation in power consumption due to a change in the environment.

Further, the controller (processor 120) provides an upper limit (timeout period) of the period spent to generate the information described above (up period).

Providing the upper limit of the period as described above avoids a situation in which the period spent for the generation (up period) continues endlessly in an environment in which the reception magnitude is extremely low.

The information described above may contain at least one of information representing the positional relationship between a positioning satellite (such as GPS satellite) that issues the positioning signal described above and the electronic apparatus 1 described above and information representing the position of the electronic apparatus 1.

The electronic apparatus 1 according to the present embodiment can therefore reduce a decrease in the success rate at which the positional information or the information used to perform positioning is generated. As a result, the successful positioning rate can be stabilized.

The electronic apparatus according to the embodiment described above includes the controller (processor 120), which intermittently drives the receiver (GPS sensor 110), which receives a positioning signal (GPS signal) and generates predetermined information (ephemeris), in a predetermined cycle, and the controller (processor 120) determines (extends as required, for example) the upper limit (timeout period) of the period to be spent for the generation described above (up period) on the basis of the period spent for the generation described above (up period) in the past.

In an environment in which the magnitude of a received positioning signal is low, since the period required for the generation typically increases, blindly extending the period to be spent for the generation significantly increases power consumption. In contrast, the controller (processor 120) in the present embodiment can determine the upper limit of the period spent per information generation (timeout period) on the basis of the period spent for the generation (up period) in the past. The electronic apparatus 1 according to the present embodiment can therefore adjust the period to be spent to newly generate the information (up period) in relation to the period spent for the generation (up period) in the past, whereby variation in power consumption can be reduced and the successful generation rate can be increased from a long-term viewpoint even when the reception magnitude varies.

Further, when the generation described above is completed in a pre-specified period (initial timeout period), the controller (processor 120) adds the portion of the pre-specified period that is left after the completion of the generation described above (remaining period) to the stock period, which is used when the upper limit described above is determined (extended).

In this case, when the generation is completed in the pre-specified period, since the controller (processor 120) adds the period not having been spent for the generation to the stock period, the period not having been spent for the generation can be used when the upper limit is determined (extended). Therefore, even when the reception magnitude varies, variation in power consumption from a long-term viewpoint can be reduced.

When the generation described above has not been completed in the pre-specified period, the controller (processor 120) adds at least part of the stock period to the upper limit described above to extend the upper limit.

In this case, the controller (processor 120) adds at least part of the stock period to the upper limit to allow the period left when the generation has been completed in the pre-specified period to be carried over and used later when the generation is not completed in the pre-specified period. The electronic apparatus 1 according to the present embodiment can therefore reduce the number of failures of the generation due, for example, to the reception magnitude.

Further, the controller (processor 120) subtracts the added period described above from the stock period described above.

In this case, the controller (processor 120) subtracts the period added to the pre-specified period from the stock period to prevent a large variation in the sum of the period spent for the generation even when the case where the generation is completed in the pre-specified period and the case where the generation is not completed in the pre-specified period both occur. Variation in power consumption from a long-term viewpoint can therefore be reduced.

Further, the controller (processor 120) sets the extended period described above at a period shorter than a predetermined period (shorter than or equal to 5 minutes, for example).

Providing the upper limit of the period to be extended as described above avoids a situation in which the period spent for the generation continues endlessly in an environment in which the reception magnitude is extremely low.

The information described above contains information (ephemeris, for example) representing the orbit of a positioning satellite (GPS satellite, for example) that issues the positioning signal described above.

The electronic apparatus 1 according to the present embodiment can therefore stabilize the rate of successful generation of the information representing the orbit of the positioning satellite.

Further, the controller (processor 120) sets the cycle described above to be shorter than an effective period of the information described above.

The electronic apparatus 1 according to the present embodiment therefore allows the receiver to generate new information before the effective period of the information expires.

Variations

The present disclosure is not limited to the embodiment described above, and a variety of variations are conceivable to the extent that they fall within the substance of the present disclosure.

In the embodiment described above, the positioning-related intermittent driving method and the decoding-related intermittent driving method may be reversed with each other, or the positioning-related intermittent driving method and the decoding-related intermittent driving method may be performed in the same manner. In both case, variation in successful reception rate and variation in power consumption can be reduced.

That is, the controller (processor 120) sets the positioning attempt cycle to be variable and determines the positioning attempt cycle on the basis of the period spent for the positioning. Instead, the positioning attempt cycle may be fixed, and the upper limit of the period spent for the positioning (timeout period) may be determined on the basis of the period spent for the positioning (up period) in the past.

Further, the controller (processor 120) sets the decoding attempt cycle at a fixed value and determines the upper limit of the period spent for the decoding (timeout period) on the basis of the period spent for the decoding (up period) in the past. Instead, the decoding attempt cycle may be variable, and the decoding attempt cycle may be set on the basis of the period spent for the decoding.

The lengths of the periods set in the embodiment described above are presented only by way of example and can be changed as appropriate in accordance with the specifications and applications of the apparatus.

In the embodiment described above, the orbit information is acquired from a GPS satellite. When the electronic apparatus 1 has a communication function, the orbit information may be acquired at least once from a server, another electronic apparatus 1, a smartphone, or any other apparatus. Further, orbit information that is effective for a period longer than that of orbit information acquired by decoding and orbit information that is effective at a future point of time later than the effective period of orbit information acquired by decoding can be acquired by the electronic apparatus 1 over communication or generated by the electronic apparatus 1 by using a known method. When the electronic apparatus 1 stores such orbit information, no decoding may be performed in the effective period of the orbit information stored in the electronic apparatus 1.

In the embodiment described above, the receiver (such as GPS sensor) and the controller (processor 120) may be separate components (controlled over wireless communication, for example).

In the embodiment described above, part or entirety of the functions of the controller (processor 120) may be incorporated in the receiver (such as GPS sensor).

The electronic apparatus 1 described above may have known functions of a smartphone, for example, a camera function and a call function.

The electronic apparatus 1 may further have a variety of sensing functions necessary for sports events, for example, a temperature sensor, a humidity sensor, an altitude sensor (atmospheric pressure sensor), and a terrestrial magnetism sensor.

The electronic apparatus 1 in the embodiment described above may be configured not only as a wrist-type electronic apparatus but also as an earphone-type electronic apparatus, a finger-ring-type electronic apparatus, an electronic apparatus attached to a sports gear for use, a head mounted display (HMD), and a smartphone and other mobile information apparatus.

The electronic apparatus 1 in the embodiment described above may have a communication function, and at least part of data acquired by the electronic apparatus 1 may be uploaded to a server on the Internet. In this case, the user can view or download the data at necessary timing and with a desired terminal.

The electronic apparatus 1 in the embodiment described above may notify the user of information in the form of outputted sound or a displayed image or in the form of vibration.

In the embodiment described above, GPS (global positioning system) is used, and any other global navigation satellite system (GNSS) may be used. For example, one or more of satellite positioning systems, such as EGNOS (European Geostationary-Satellite Navigation Overlay Service), QZSS (Quasi Zenith Satellite System), GLONASS (GLObal NAvigation Satellite System), GALILEO, and BeiDou (BeiDou Navigation Satellite System), may be used. As at least one satellite positioning system, a satellite-based augmentation system (SBAS), such as WAAS (Wide Area Augmentation System) and EGNOS (European Geostationary-Satellite Navigation Overlay Service), may be used.

The embodiment and the variations described above are presented by way of example, and the present disclosure is not limited thereto. For example, the embodiment and any of the variations can be combined with each other as appropriate.

The present disclosure encompasses substantially the same configuration as the configuration described in the embodiment (for example, a configuration having the same function, using the same method, and providing the same result or a configuration having the same purpose and providing the same effect). Further, the present disclosure encompasses a configuration in which an inessential portion of the configuration described in the embodiment is replaced. Moreover, the present disclosure encompasses a configuration that provides the same advantageous effect as that provided by the configuration described in the embodiment or a configuration that can achieve the same purpose as that achieved by the configuration described in the embodiment. Further, the present disclosure encompasses a configuration in which a known technology is added to the configuration described in the embodiment.

What is claimed is:

1. An electronic apparatus comprising:
a global positioning system (GPS) sensor; and
a controller that is configured to intermittently drive the GPS sensor in a predetermined cycle between an up period where the GPS sensor receives a positioning signal to generate position information and a sleep period where the GPS sensor is idled after the GPS has generated the position information,
wherein the controller is configured to control when the GPS sensor is to enter the up period, control an amount of time that the GPS sensor remains in the up period to receive the positioning signal to generate the position information, and control an amount of time that the GPS sensor remains in the sleep period,
wherein the controller is configured to determine an upper limit of the amount of time that the GPS sensor remains in the up period to receive the positioning signal and generate the position information on the basis of a previous up period where the GPS sensor received a previous positioning signal, and is configured to either increase or decrease the sleep period based on the amount of time that the GPS sensor remained in the up period to receive the positioning signal to generate the position information, and
wherein when the GPS sensor receives the positioning signal and generates the position information before the upper limit has been reached, the controller is configured to add the remaining amount of time to a stock time period that is stored by the controller and decrease the sleep period.

2. The electronic apparatus according to claim 1, wherein when the GPS sensor fails to receive the positioning signal and generate the position information before the upper limit has been reached, the controller is configured to subtract time from the stock time period and add the time subtracted from the stock time period to each of the upper limit and the sleep period to increase each of the upper limit and the sleep period.

3. The electronic apparatus according to claim 1,
wherein the GPS sensor is configured to receive information representing an orbit of a positioning satellite that transmits the positioning signal.

4. A control method of an electronic apparatus including a GPS sensor and a controller, the control member comprising:
intermittently driving the GPS sensor in a predetermined cycle between an up period where the GPS sensor receives a positioning signal to generate position information and a sleep period where the GPS sensor is idled after the GPS has generated the position information,
wherein the intermittent driving of the GPS sensor includes:
controlling when the GPS sensor is to enter the up period;
controlling an amount of time that the GPS sensor remains in the up period to receive the positioning signal to generate the position information;
controlling an amount of time that the GPS sensor remains in the sleep period;
determining an upper limit of the amount of time that the GPS sensor remains in the up period to receive the positioning signal and generate the position information on the basis of a previous up period where the GPS sensor received a previous positioning signal; and
either increasing or decreasing the sleep period based on the amount of time that the GPS sensor remained in the up period to receive the positioning signal to generate the position information,
wherein when the GPS sensor receives the positioning signal and generates the position information before the upper limit has been reached, the method further comprises adding the remaining amount of time to a stock time period that is stored by the controller and decreasing the sleep period.

5. The control method according to claim 4, wherein when the GPS sensor fails to receive the positioning signal and generate the position information before the upper limit has been reached, the control method further comprises subtracting time from the stock time period and adding the time subtracted from the stock time period to each of the upper limit and the sleep period to increase each of the upper limit and the sleep period.

* * * * *